United States Patent [19]
De Marco et al.

[11] Patent Number: 5,761,440
[45] Date of Patent: Jun. 2, 1998

[54] SYSTEM AND METHOD UTILIZING MULTIPLE SEARCH TREES TO ROUTE DATA WITHIN A DATA PROCESSING NETWORK

[75] Inventors: Jose Geraldo Bueno De Marco, Campinas, Brazil; Jeffrey Wayne Kidd; Edward Hau-Chun Ku, both of Cary, N.C.; Karen Park Heron; Simin Hosne Sanaye, both of Raleigh, N.C.; Luis Filipe de Sousa Silva, Rio de Janeiro, Brazil

[73] Assignee: International Business Machines Corporation, Armonk, N.Y.

[21] Appl. No.: 306,783

[22] Filed: Sep. 15, 1994

[51] Int. Cl.$^6$ .................... G06F 13/14; G06F 15/173
[52] U.S. Cl. .................. 395/200.75; 395/200.72; 370/392
[58] Field of Search .............. 395/200.01, 200.15, 395/200.16, 200.1, 200.75, 200.72, 200.68, 200.5, 200.3; 364/222.9, 222.81, 222.82, 242.95, 242.96, 949.91, 949.92, 949.93, 949.94; 340/825.02, 826, 827; 370/85.13, 475, 392

[56] References Cited

U.S. PATENT DOCUMENTS 4,327,354 4/1982 Persoon .
4,799,189 1/1989 Kent .

FOREIGN PATENT DOCUMENTS 2173026 10/1986 United Kingdom .

OTHER PUBLICATIONS

Amitai, Z. "Address Filtering in FDDI LAN Bridges (the CAM Solution)," Wescon/89, Conference Record 1989, pp. 235–239.

Kishimoto, H. "An Asynchronous Correlation Receiver for a Bus Type Twisted Pair LAN," Trans. Inst. Electron. Inf. Commun. Eng. B I (Japan) vol. J73B I, No. 1, Jan. 1990, pp. 53–60.

Kishimoto, H. "An Asynchronous Correlation Receiver for a Bus Type Twisted Pair LAN," Electron. Commun. Jpn. 1, Commun. (USA) vol. 74, No. 2 Feb. 1991, pp. 1–9.

Gibbs, D. S., et al. "A Content Addressable Memory for Data Communications," Microprocess. Microsyst. (UK) vol. 16, No. 2 1992, pp. 59–66.

Wilnai, D. and Amitai, Z. "Speed LAN Adress Filtering with CAMs," Electron. Des. (USA) vol. 38, No. 8 26 Apr. 1990, pp. 75–78, 80., 89–90.

Yu Tie-cheng. "An Approach to Speed the Process of Pattern Matching," Acta Acustica, No. 3, pp. 148–151.

*Primary Examiner*—Mark H. Rinehart
*Attorney, Agent, or Firm*—Kelly K. Kordzik; John J. Timar

[57] ABSTRACT

A system and method for efficiently routing data within a network, such as a local area network. A search tree is utilized within the bridge/router in order to store addresses. The search tree is utilized by the router for more efficiently and more quickly determining where one or more received frames of data are to be transmitted within the network. Maintenance of the search trees is also provided so that new addresses may be added to the search trees and addresses may be deleted from the search trees. The search trees are developed by partitioning the addresses into bit groups.

10 Claims, 14 Drawing Sheets

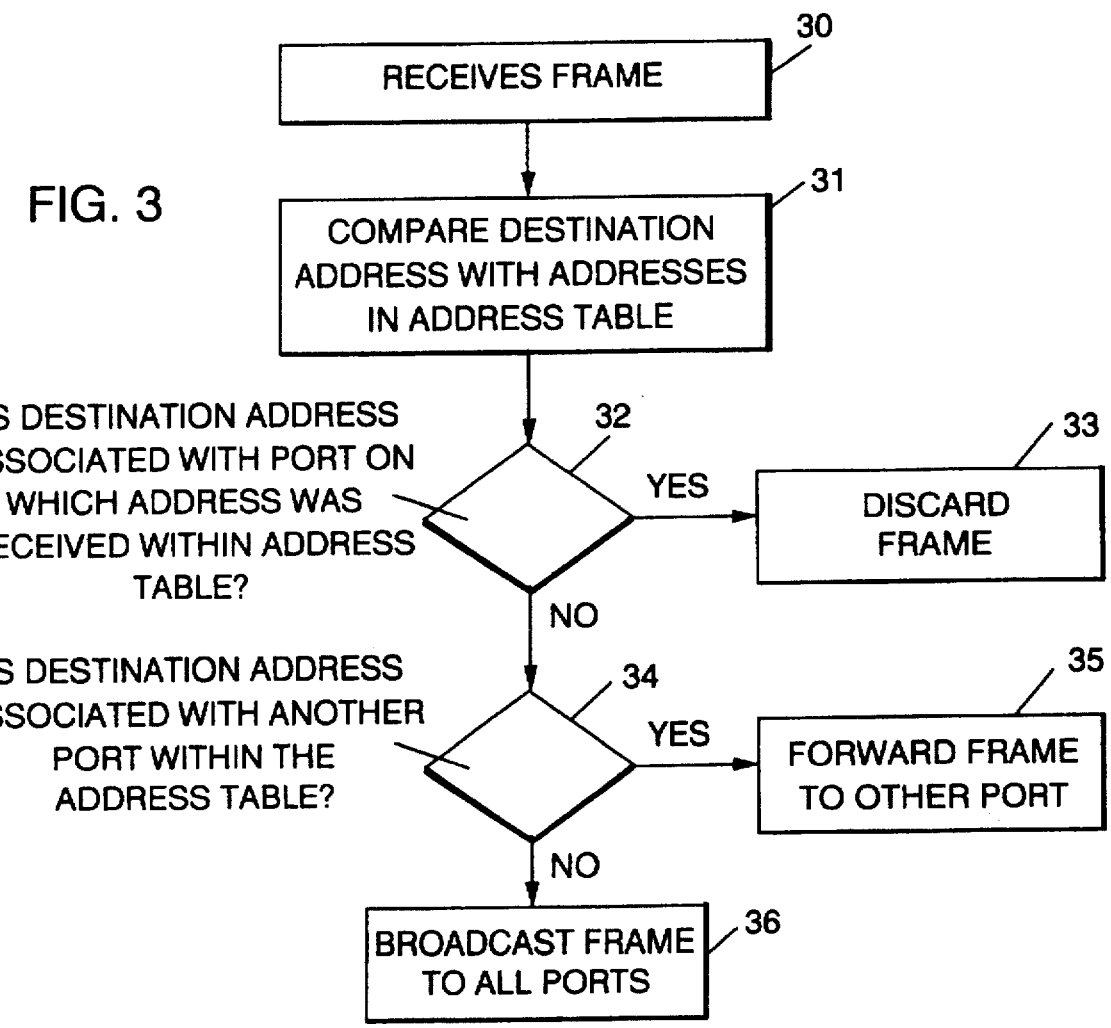

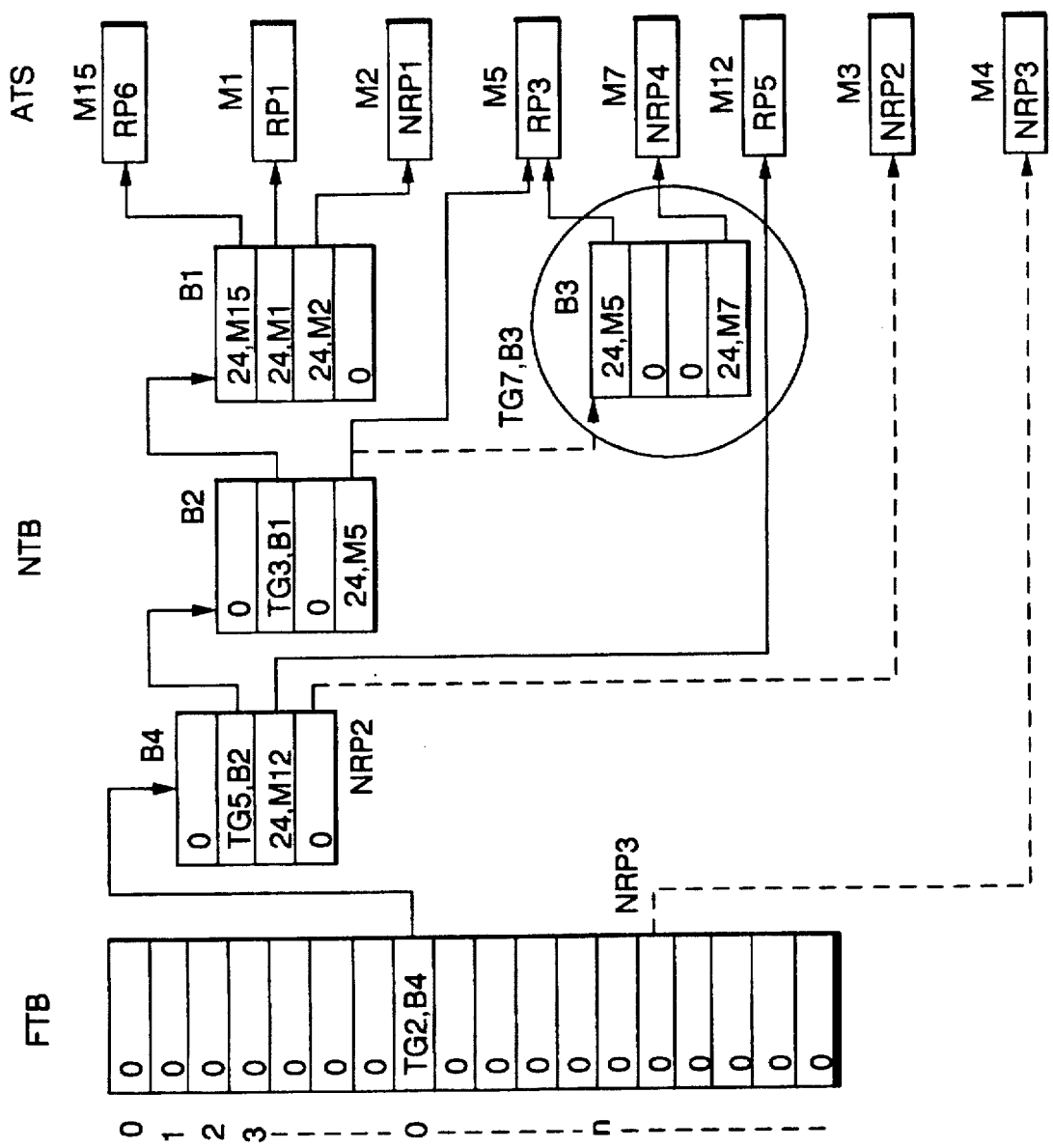

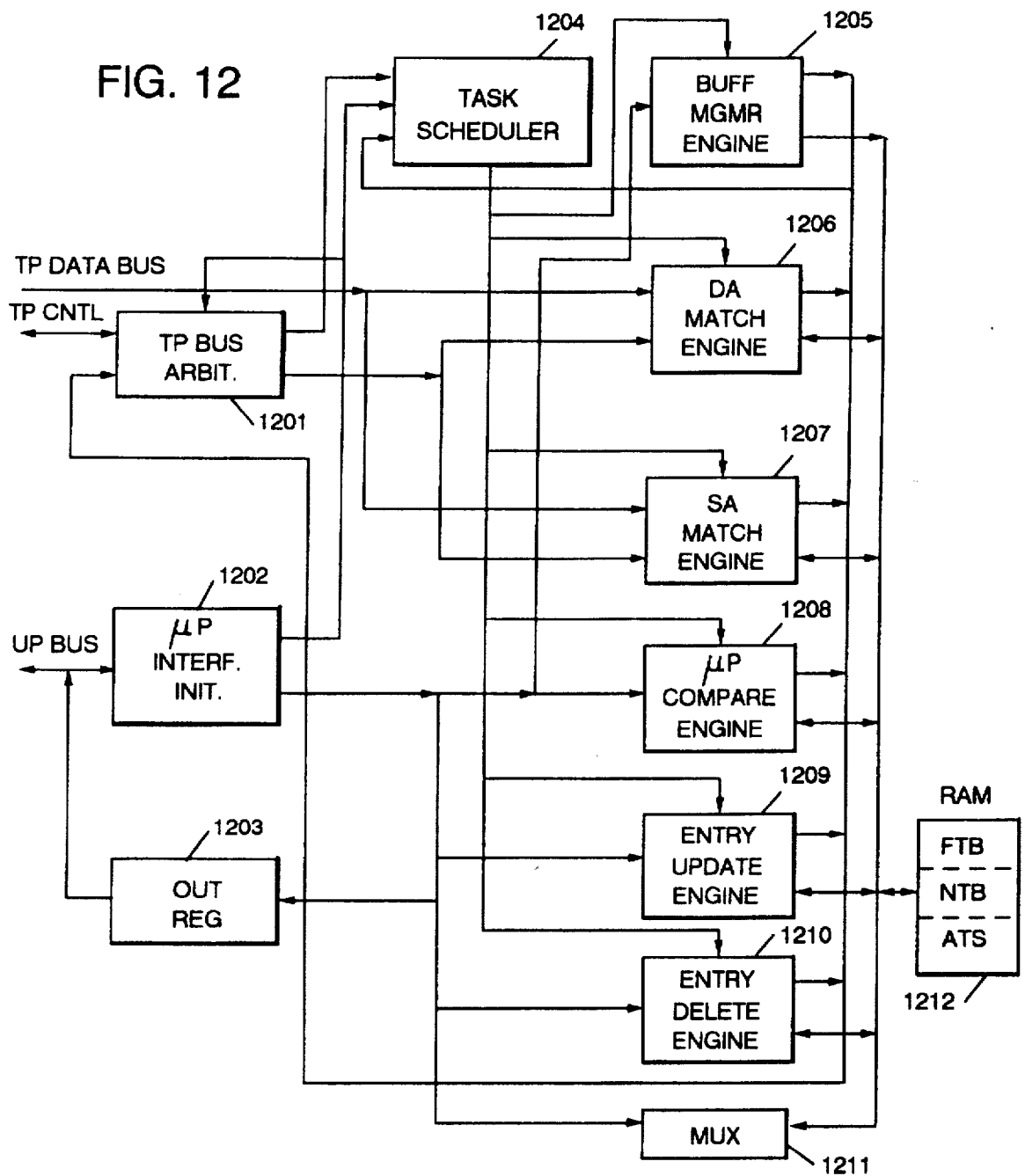

SYSTEM AND METHOD UTILIZING MULTIPLE SEARCH TREES TO ROUTE DATA WITHIN A DATA PROCESSING NETWORK

TECHNICAL FIELD OF THE INVENTION

The present invention relates generally to data processing systems, and more particularly, to a system and method for routing data within a data processing network.

BACKGROUND OF THE INVENTION

A network is a group of computers and associated devices that are connected by communications facilities. A network can be as small as a local area network ("LAN") consisting of a few computers, printers and other devices, or it can consist of many small and large computers distributed over a vast geographic area. Small or large, a computer network exists to provide computer users with the means of communicating and transferring information electronically.

A router, or bridge, is an intermediary device on such a communications network that expedites message delivery. On a single network linking many computers through a mesh of possible connections, a router receives transmitted messages and forwards them to their correct destinations over the most efficient available route. On an interconnected set of LANs using the same communications protocols, the router serves a somewhat different function of acting as a link between LANs, enabling messages to be sent from one LAN to another.

The many and various computers and devices within a network are coupled to a router through its ports (locations for passing data in and out of a computing device). As the router receives a communication from one device intended for a second device within the network, the router compares the destination address (address of the second device) provided with the communication to a stored address list, which indicates which port within the router is associated with the second device. The router then directs the communication to the appropriate port coupled to the second device.

Prior art routers are provided an address/port list beforehand, or develop such an address/port list on a dynamic basis. Such lists are stored within the router and accessed upon receipt of a communication from a connected device. The router then compares the destination address of the communication to each item within the list until a match is obtained. Generally, each new search through the list begins at the "top" of the list and proceeds sequentially through the addresses until a match is obtained. With such a configuration, where there are N addresses within the list, the possibility exists that up to N comparisons will have to be made before a match is found. If N is very large, communications within the network may be slowed considerably due to the router.

Thus, there is a need in the art for a more efficient and faster technique for routing messages through a router within a network.

SUMMARY OF THE INVENTION

Thus, it is an object of the present invention to more efficiently route data through a bridge/router within a network.

In an attainment of the above object, a search tree technique is utilized for storing and comparing destination addresses/ports of devices within the network.

Address field data is used to determine whether and where a received frame of data should be forwarded in a network.

The fast digital pattern match technique of a preferred embodiment of the present invention matches digital patterns against a stored pattern database configured into a search tree, which is ideal for address recognition in a LAN bridge/router subsystem environment. The pattern match technique utilizes memory to store test instructions. Each test instruction has a test command and a memory pointer. The test command corresponds to the bits of the address to be examined. The memory pointer points to the memory block that stores the test instructions for the next test operation. The test instructions are linked together during the learning mode to form the search tree. Only those bit groups of the compared bit patterns that can differentiate among themselves are used during the learning mode to form the search tree.

Depending upon the test pattern bit structure of a received address, the pattern match process starts on a specific test tree. The test instructions, prestored during the learning mode, determine the path of the tree to follow. At the end of a search, the test pattern either maps onto a non-referenced end node or collides with a reference pattern (a stored address/port). A test for exact match between the message address and the stored address must take place. A match is found only if the message address and the stored address pattern are exactly matched.

When a new address pattern either collides with an existing address pattern or maps onto a non-referenced end node during the learning mode, the search tree is expanded. Search instructions are added to the search tree to separate between the old and the new address reference patterns. When the tree needs extensions, it extends from the end of the tree node.

When deleting an address reference pattern, the search tree associated with the deleting pattern is examined and any unwanted test entry and test blocks are removed. The search tree is relinked to clear the unwanted test block, and the removed test block of memory is made available for later use.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 2 illustrates a flow diagram for storing addresses/ports within a router;

FIG. 3 illustrates a flow diagram for routing data through a router;

FIGS. 8a–c illustrate an example search tree having addresses updated therein;

FIG. 12 illustrates an implementation of the present invention within a router device.

DETAILED DESCRIPTION OF A PREFERRED EMBODIMENT OF THE INVENTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
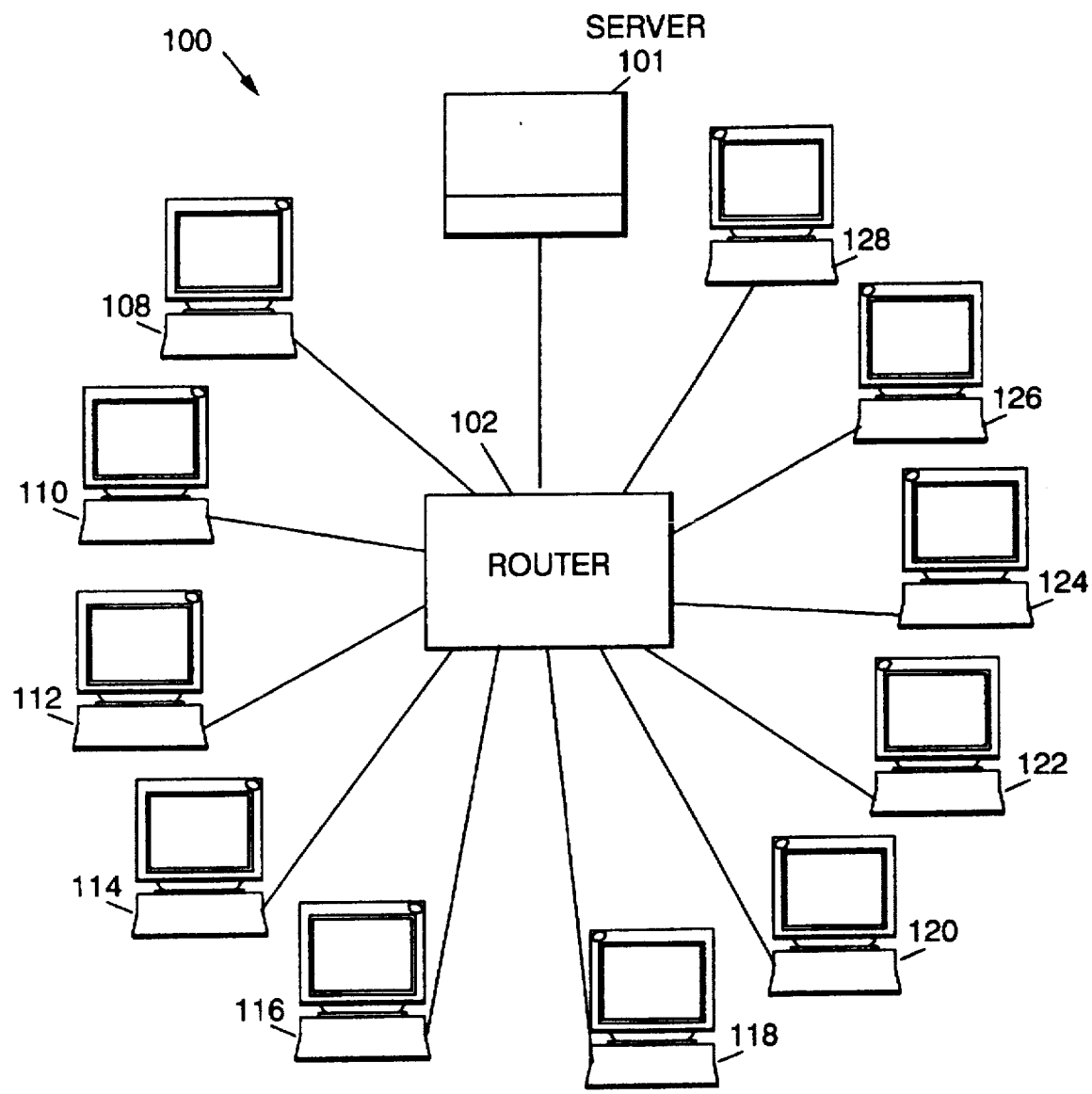
FIG. 1 illustrates a network configuration utilizing a router.

Referring now to the drawings wherein depicted elements are not necessarily shown to scale and wherein like or similar elements are designated by the same reference numeral through the several views, FIG. 1 illustrates a representative network system 100, wherein server 101 and data processing systems 108, 110, 112, 114, 116, 118, 120, 122, 124, 126 and 128 are interconnected via router 102. As each data processing system or server 101 intends to communicate with any other device within network 100, router 102 facilities such communications by efficiently directing the communicated data to the appropriate destination device, by essentially coupling its ports. For example, if device 114 desires to send data to device 128, device 114 will transmit such data to router 102, along with the Destination Address associated with device 128, and router 102 will compare the Destination Address received with the data from device 114 to a list of addresses/ports within its memory, and then route the received data to device 128 upon acquiring a match between the received Destination Address and one of the address/port pairs listed within its memory.

Referring next to FIG. 2, there is illustrated a flow diagram of a process implemented within router 102 for building the aforementioned address list within a memory unit in router 102. Upon receiving a communication of one or more frames of data (step 20) from a device within network 100, router 102 proceeds at step 21 to record the Source Address transmitted with the data and associated with the transmitting device. For example, if router 102 receives one or more frames of data from device 112, router 102 will record the Source Address associated with device 112. Thereafter, at step 22, router 102 will associate the Source Address of device 112 with the particular port within router 102 where device 112 is coupled to router 102. More than one device, or an entire separate network, may be coupled to any one port within router 102. Furthermore, a port within router 102 may also be partitioned via other well-known methods, such as time division multiplexing and other well-known software techniques.

As a result of step 22, router 102 eventually builds an address table within its memory, wherein the various devices within network 100 are associated with ports within router 102.

Referring next to FIG. 3, there is illustrated a flow diagram of a process for routing frames of data within network 100. At step 30, one or more frames of data are received by router 102 from one of the various devices within network 100. Note, steps 20 and 30 may be identical, and the processes illustrated in FIGS. 2 and 3 may be executed simultaneously within router 102.

Next, at step 31, router 102 compares the Destination Address transmitted along with the one or more frames of data to addresses within the address table developed by router 102 (see FIG. 2). In step 32, router 102 determines whether or not the Destination Address is associated within the address table with the same port on which the Destination Address and the one or more frames of data were received. If yes, then there is no reason to route the frames of data, since they are intended for the same device that transmitted the frames of data. As a result, in step 33, router 102 discards the received frames of data. For example, if router 102 receives a frame of data from server 101, and the Destination Address transmitted along with the received frame of data is determined to be associated with the router port assigned to server 101, then router 102 will discard the frame of data, since server 101 already has the frame of data within its possession.

However, if the Destination Address is not associated with the same port on which it was received, then at step 34, router 102 determines whether or not the Destination Address is associated with another port within the address table. If yes, at step 35, router 102 will then forward the received frame of data to the other port. For example, if the Destination Address transmitted along with the frame of data from device 108 is determined to be associated with the port associated with device 124, then router 102 will transmit the received frame of data to device 124 through the port associated with device 124.

If the Destination Address is not associated with another port, then router 102 will broadcast the received frame of data to all the ports, as illustrated in step 36.

As discussed above, address tables have traditionally been produced as a sequential list of addresses associated with router ports. With such traditional address lists, if router 102 were to perform steps 32 and 34, then the Destination Address received would be compared to each and every address within the address table until a match is found. If the number of devices within network 100 is quite numerous, such a search would require a considerable amount of time. The worst cases associated with such a search method would occur if a match is not discovered until the last item within the address table produces a match, or if no match is found, resulting in a broadcast of the received frame of data (step 36).

A preferred embodiment of the present invention provides a more efficient and faster technique for searching through an address table stored within router 102.

The present invention provides a more efficient address search technique by storing the addresses/ports within one or more search trees by partitioning the addresses into a plurality of bit groups and building the search trees with these bit groups. Thus, a search is performed by partitioning a received address and sequentially comparing these bit groups with the nodes of a search tree. If, through the search process, a leaf within a search tree is reached without acquiring an exact match between the received address and the entries within the tree, then, if the received address is a Source Address, the search tree is extended using the bits within the Source Address. This is referred to as the "learning" or "entry update" process of the present invention. If the received address is a Destination Address, and a leaf is reached without acquiring an exact match, then it is determined that there is no exact match within the address table for the Destination Address and a broadcast (step 36) of the frame data associated with the Destination Address is performed.

A deletion of an address within a search tree may also be performed, as will be described below.

During the learning mode, the address table within router 102 is updated using the Source Address, a received frame signature and the receiving port identification number. When receiving a frame of data, router 102 matches the Destination Address of the received frame of data against entries against the search trees in the address table.

For every incoming frame of data, there is associated a Destination Address for where the data is intended to go plus a Source Address indicating where the data originated. For every incoming frame of data, the Destination Address and the Source Address are processed against the address table entries for the forwarding process of the present invention. Hereinafter, it will be assumed that a network address within network 100 consists of 6 bytes. It will be further assumed for demonstration purposes only that system 100's address table supports a maximum of 8,192 reference addresses.

Figure 4:
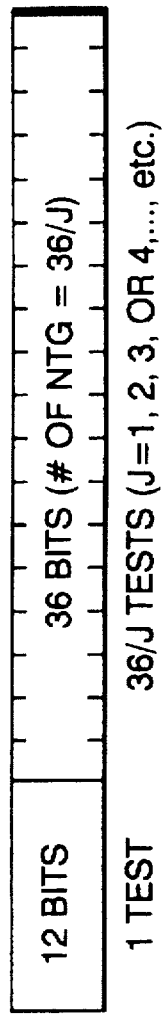
FIG. 4 illustrates a test group mask for defining the partitioning of addresses in accordance with the present invention.

The Destination and Source Addresses will be hereinafter often referred to as test patterns. This will assist in indicating that the received addresses are tested against the bit patterns (addresses) stored within the search trees. The test patterns are partitioned into predetermined test bit groups. Each test bit group associates with a test mask. The test masks are numbered. The test groups can be one bit or multiple bits. The test masks identify the test pattern bits to be examined for match actions during the process. FIG. 4 illustrates a test mask in accordance with a preferred embodiment of the present invention. This mask is 48 bits long, correlating with the above-noted convention of a network address consisting of 6 bytes. As will be further discussed below, the first 12 bits are masked for the first test to be performed, while the remaining 36 bits are divided into test groups for the subsequent tests to be performed in the match process. In the present example, the test groups consist of 2 bits each, though other sized groups may be utilized.

Figure 5:
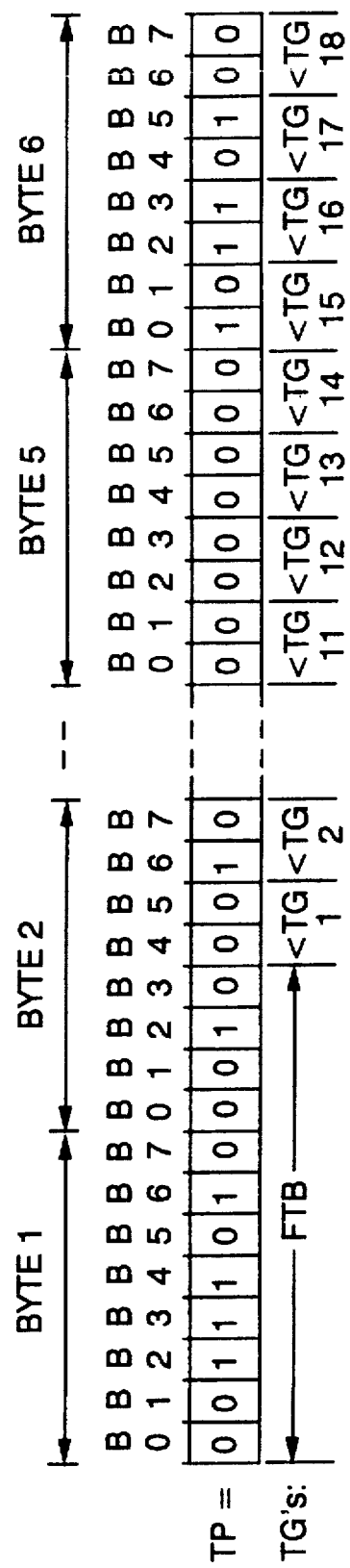
FIG. 5 illustrates an example of an address partitioned for operation within the present invention.

Referring next to FIG. 5, there is illustrated an example test pattern ("TP") wherein the first test block ("FTB") and the 36/2=18 test groups ("TGs") are identified.

The memory utilized by the present invention within router 102 is divided into three parts. The first part stores the various FTBs, which store the test instructions to begin a search through the search trees. In order to speed up the match process, it is recommended that the FTB be a larger test block (bit group with test bits) than each of the TGs. With respect to the example presented above, there are 4,096 entries in the FTB, wherein each FTB consists of 12 bits.

The next portion of router 102 memory stores the next test blocks ("NTBs"), which store the test instructions that continue the search process after one has begun as a result of an FTB. The NTB memory requirement is as follows:

(1) Let the maximum number of reference patterns to be recorded equal to #M.
(2) To separate #M reference addresses, only (#M−1) NTB blocks are required.
(3) Let the number of bits in each of the test blocks equal to #j (TB=2, 3, . . . ).
(4) The maximum number of entries required in a NTB= 2×EXP (#j).
(5) The test instruction data length equals to (Inte(log2 (#TG's+2))+Inte(log2(#M−1)), wherein Inte(x) is the integer larger or equal to x.

For the example above, a total of (8,192−1) NTB blocks are needed. Each NTB block has four entries to match the 2-bit test group as defined in the example above (00, 01, 10, 11), which are hereinafter referred to as (c1, c2, c3, c4).

The number of bits in each test also determines the worst case timing in the match process. For example, if it is assumed that the FTB is 12 bits and all other test blocks are two bits, then the worst case timing for a 48-bit test pattern to reach a potentially matched reference pattern (stored address) is 19 test cycles. If the system requires a maximum of 8,000 reference patterns to be referenced, the total number of NTB entries is 31996(4*(8,000−1)). However, if the number of bits in a test block is increased from two bits to four bits, it will take only 10 cycles in the worst case to reach a match of a reference pattern; however, the total number of NTB entries is increased to 127984(16*(8,000−1)). Thus, the system designer is permitted to optimize matching speed and cost requirements as desired.

The third portion of router 102 memory required is reserved for the address table store ("ATS"), which stores the reference patterns (address data) and their unique signature information, along with their associated router ports. For the example above, a total of 8,192 ATS entries are required for storing the reference patterns and their signatures.

Non-used, or "free" ATS entries and "free" NTB blocks are cleared and then chained together to form empty entry block chains. One chain is for ATS entries, the other is for NTB blocks. An ATS head register holds the first entry location of the ATS entry chain, and an ATS tail register holds the last entry location of the ATS empty chain. When the ATS head register content equals the ATS tail register content, the ATS can hold only one more entry. The NTB empty chain also has its NTB head and tail registers configured simultaneously.

During the learning mode, when new ATS and/or NTB entries are needed for extending the test tree, they are taken from the location registered in the head registers, and the head registers are updated to the next free entry location. During the delete process, when an ATS or an NTB memory location is no longer needed, it is cleared and then chained to the tail of its associated empty chain and the associated tail register is updated. The contents of the head and tail registers are continuously kept up-to-date.

During the entry update, insertion and deletion modes to be described, the test tree must be searched to determine where a modification is to be performed. The test tree is structured such that, when deleting a reference pattern (ATS entry), at most, only the contents within the test blocks (FTB and/or NTB) of the last three test instructions need to be modified. By tracking the last three test instructions for any entry, the efficiency of the deletion process can be improved.

Registers DL1, DL2 and DL3 are set up within the system to record the last three test instructions. DL1 holds the location (pointer) of the referenced entry to be deleted. This information can be used to locate the ATS entry, clear the entry and place the storage location that held the deleted entry back into the "free" pool.

DL2 holds the LTB entry location (pointer). This information can be used to locate the test instruction that needs to be cleared for deleting the ATS entry.

DL3 holds the location of the test instruction that points to the LTB (test block pointer). This information can be used to remove the unnecessary test block after the ATS entry is deleted. Note, after entry deletion, if the NTB (pointed to by the DL2) holds only one test instruction (the remaining three locations are all clear), this NTB is redundant and may be removed. By modifying the proper entry in the test block (FTB or NTB) pointed to by the DL3 content, the redundant NTB can be easily removed and placed back in the "free" pool for later use.

For the entry update process, at most, only the last two test instructions are needed to process the entry update and expand the search tree. Each reference address pattern is unique and is thus stored in its own unique ATS entry in memory. For adding a new reference pattern ("NRP"), i.e., a Source Address, into the ATS RP table, the NRP must first go through the search process. DL1 and DL2 record the last two test instructions during the NRP search process.

Figure 6:
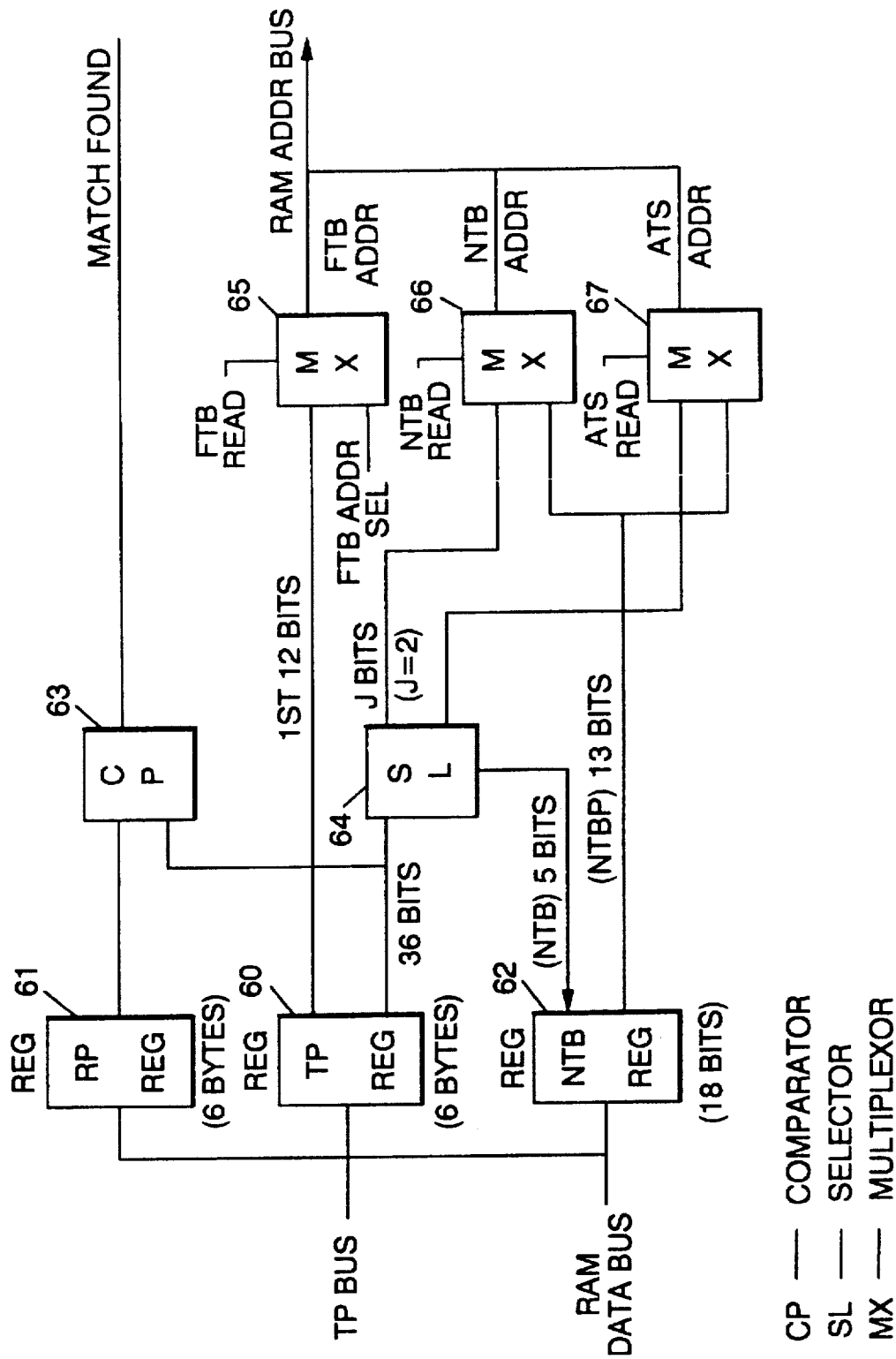
FIG. 6 illustrates a logic diagram in accordance with the present invention.

Referring next to FIG. 6, there is illustrated a logic diagram for implementing a pattern match process that is utilized within the searching, learning and entry modes to be described below.

When implementing the logic circuit illustrated in FIG. 6, two non-overlapping clock pulses, clock A and clock B, may be utilized to run the logic. For example, circuits 60, 61 and 62 may sample data when clock A provides an active signal and release data when clock B provides an active signal. Circuits 65, 66 and 67 may sample data when clock B is gated active and release data when clock A is gated active.

Note, with respect to the update and delete modes, the logic diagram illustrated in FIG. 6 only shows the part of these modes with respect to pattern matching.

Figure 7:
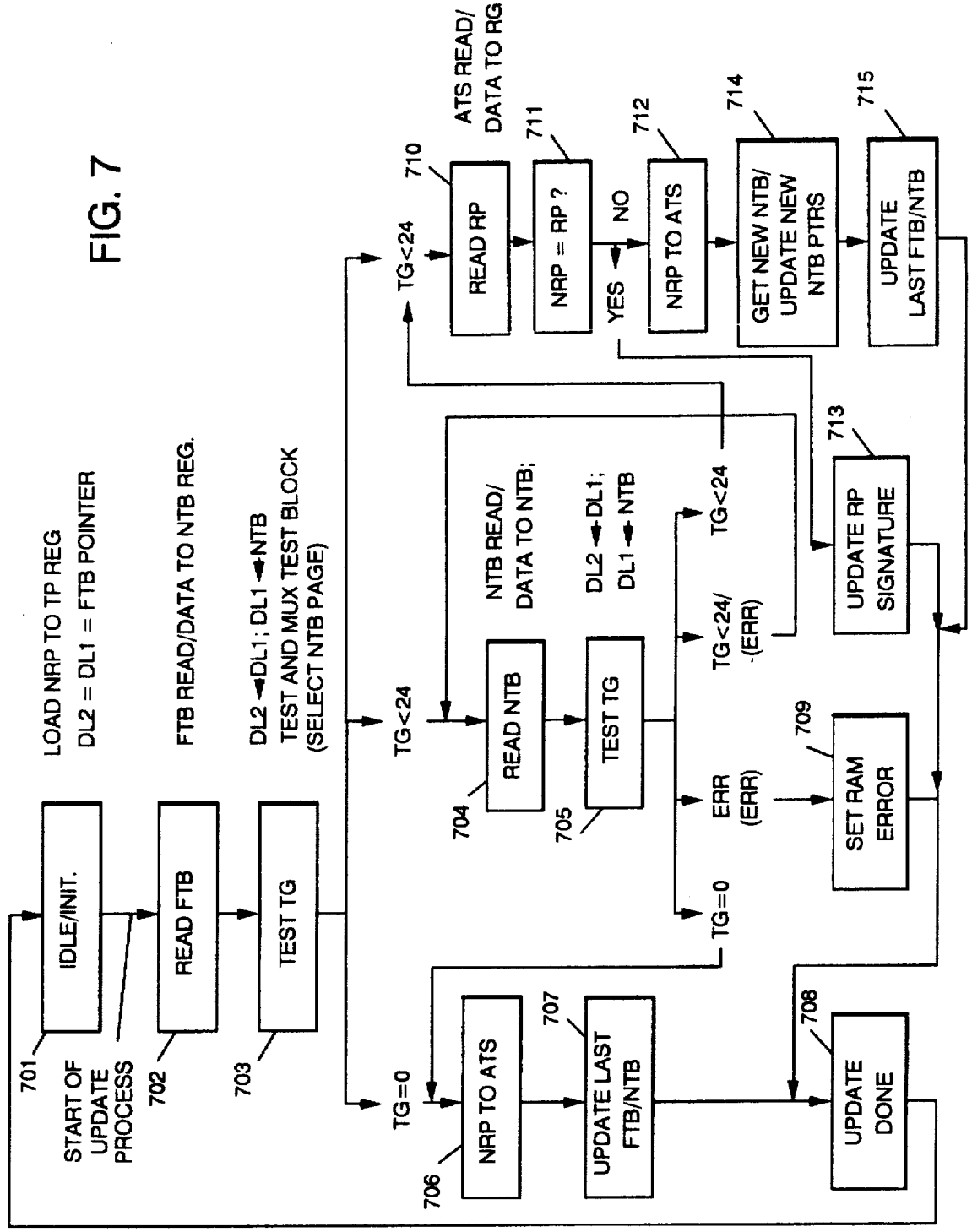
FIG. 7 illustrates a diagram for updating address information in accordance with the present invention.

Next, referring to both FIGS. 6 and 7, the process for updating entries (Source Addresses) within the search trees is described. In step 701, the present invention is in an idle state waiting for receipt of a test pattern. Upon receipt of a new reference pattern, or test pattern, the NRP is loaded into register 60, which has a width of 6 bytes. The first 12 bits, designated as FTB, are fed into multiplexor 65 (FTB address select is clocked), while the remaining 36 bits are made available to selector 64.

Please note that the comparators, selectors, multiplexors and registers are common and commercially available logic units for performing the functions described herein.

The first 12 bits of the NRP loaded into multiplexor 65 become the FTB pointer for addressing router 102's memory. Registers DL2 and DL1 are initialized to be equal to this first FTB pointer.

Next, at step 702, the FTB is utilized to read an address from memory, which address is then loaded into NTB register 62.

Note that NTB register 62 has a width of 18 bits. This is to accommodate the width of the test block stored within memory. Each of the test block entries stores a test instruction, which consists of a 5 bit test command and a 13 bit test block pointer. The test block pointer points to the test block (memory location) that has the entry that holds the test instruction for the next search action. The test command is a test number which correlates to the test mask described above. The test command identifies (using selector 64) which of the TP bit groups will be examined during the search process. The bit pattern of the TP to be examined determines the test block entry that holds the test instruction for the next search step. If the test command has stored therein a "0", then this defines that the search is ended and no reference pattern match has occurred. A test command value of 1–18 determines that another test block is to be tested. A test command of a value of 24 defines that a potentially matched reference pattern is located.

The 13 bit address pointer indexes to the next test block ("NTB") location within memory.

During the learning mode, a test tree is extended only if the NRP (Source Address) is terminated either on a "dead end" node (entry with test command of "0") or on a collision with an existing RP, where the RP is different from the NRP. When terminated on a "dead end" node, the NRP is added into the RP database. A test instruction consisting of a test command of a #E (defining a search ending with a potentially matched RP) determines that the NRP location (pointer) is saved into the "dead end" entry. If the test pattern collides with an RP, and the RP and NRP are identical, only the RP signature information may be updated. However, if the RP and NRP are different, the NRP is added onto the RP database. Then, the test group that has the bit differences between the RP and the NRP is identified and a new test block is introduced into the tree to save the test instructions for pointing to the original RP and the NRP now stored within the ATS. The test instruction in the test block entry that formally pointed to the RP stored within the ATS is replaced by a test instruction now pointing to the new test block formed.

In step 703, a test is performed on the received test command, i.e., the 5 bits stored within NTB register 62, to determine its value. If the test command is equal to 0, the process proceeds to step 706. If the test command equals to 24, the process proceeds to step 710. If the test command is neither equal to 0 nor 24, but is less than 24, then the process proceeds to step 704. The contents of register DL1 are stored in register DL2, and the contents within the NTB register are stored in register DL1.

If the test command value does equal to 0, then this indicates that no entry currently exists within the test tree that matches the new reference pattern. Thus, at step 706, the new reference pattern is added into the ATS. In step 707, the FTB is updated to be a LTB, or last test block, which points to a matched reference pattern, which is now NRP stored within ATS. Thus, the FTB/LTB will have a pointer to the memory location within ATS that is storing the NRP. Next, at step 708, the update is completed and the process returns to step 701 to wait for a new address to be received.

If the test command has a value of 24, then this means that a matched reference pattern has potentially been found. In this case, selector 64 will use the 5-bit test command to select a test group (in this example, 2 bits) to send to multiplexor 67 (ATS read is clocked) to combine with the 13-bit pointer to then select an ATS address from memory in order to read the reference pattern stored within ATS which is transferred to register 61. Thereafter, at step 711, comparator 63 determines whether or not NRP equals to RP. If NRP equals to RP, then the process proceeds to step 713 to update the reference pattern signature information. This is all that is required during the learning mode, since the reference pattern already exists within the ATS memory. The signature information may include a time stamp for when the NRP was received by router 102. The process then proceeds to step 708, and on to step 701.

If at step 711, NRP does not equal to RP, then the process proceeds to step 712 to send the NRP to be stored within the ATS memory locations, as described with respect to step 706. At step 714, then the test group (i.e., the FTB) is updated so that it points towards the NRP and towards the RP. That is, the test group bit patterns that are different between the NRP and the RP are utilized to point separately to their associated ATS entries. While steps 712 and 714 prepare the new RP, step 715 inserts the NRP into the search tree. The process proceeds then to step 708.

If within step 703, the test command has a value of less than 24, then the process in FIG. 7 proceeds to step 704, wherein selector 64 sends the next test group within NRP to multiplexor 66 (NTB read is clocked) which combines those two bits with the 13 bit pointer stored within register 62 to be utilized as an address for accessing within ATS memory the next test block. This next test block is then entered into register 62. At step 705, the contents of register DL1 are updated to register DL2 while the contents of this next test block are updated to register DL1. Also within step 705, the 5 bit test command is then determined. As before with step 703, if the test command has a value of 0, the process proceeds to step 706. If the test command has a value of 24, the process proceeds to step 710. If an error condition results, the process proceeds to step 709. Such errors may be a parity error, the occurrence of an invalid test command, i.e., a test command of 20, 21, . . . etc. that is not "coded" for the design, or a test command repeatedly appearing within a match process, i.e., an error must occur if the test group is involved more than once within a particular search path.

However, if the test command has a value less than 24, the process returns to step 704, wherein selector 64 sends the next 2 bit test group to multiplexor 66 which combines it with the 13 bit pointer from the previously received next test block in order to address and retrieve the next test block within ATS memory, which is then stored within register 62. As long as the test command value is valid and less than 24, steps 704 and 705 will repeat.

Figure 8A:
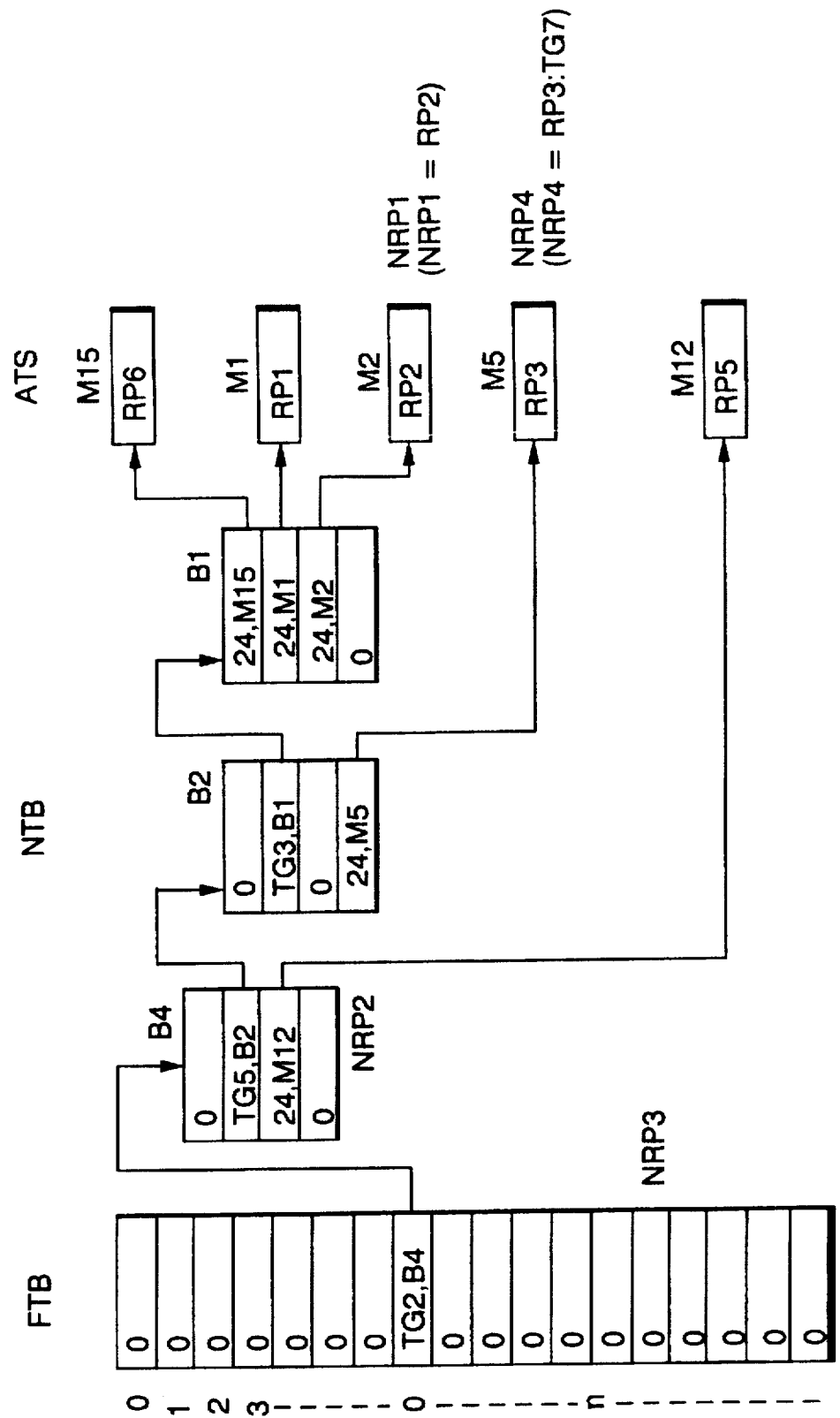
Figure 8C:
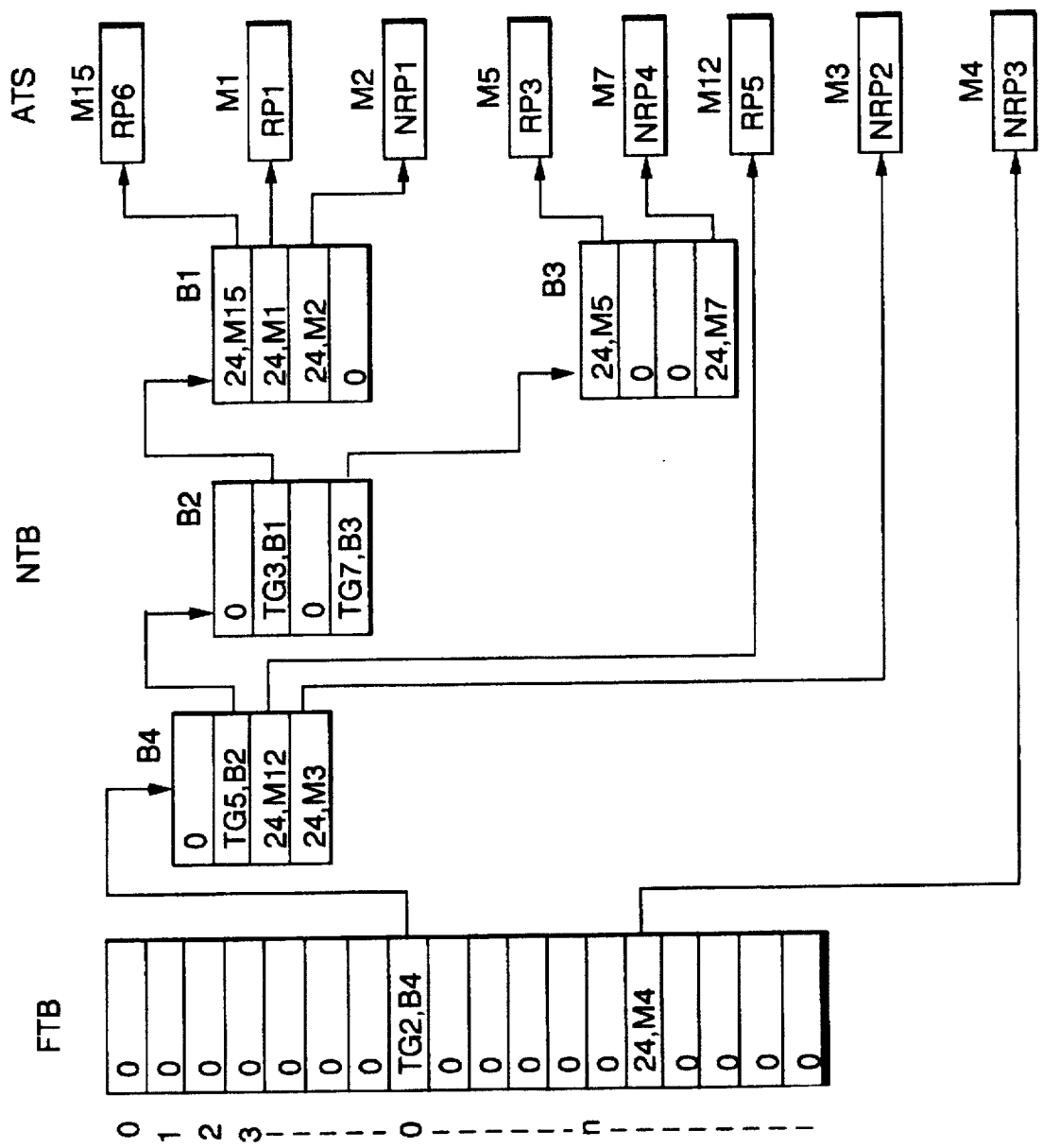

The aforementioned process may be better understood by referring to the search tree example illustrated in FIGS. 8a–c, wherein the columns on the far right illustrate ATS memory entries (designated MX, where X = a positive integer).

When a new reference pattern is eventually mapped on to an RP (ATS) entry, and the NRP and RP are not identical (step 711), then the search tree is expanded. Such an instance is illustrated in FIGS. 8a–c wherein NRP4 has mapped (after a couple of passes through steps 704 and 705) onto ATS entry RP3, but yet NRP4 and RP3 are not identical (FIG. 8a). In this instance, a new ATS entry M7 is created for NRP4 (step 712) (FIG. 8b). Then, the bit differences between NRP and RP are then determined and utilized to find the test group that previously pointed to RP3, in this case (24, M5) in B2__c4. Thereafter, a new NTB, B3, is created (step 714) (FIG. 8b). Then, new test instructions are stored within B3 in order to point towards RP3 and NRP4 (FIGS. 8b–c). Each of these test instructions will include a test command having a value of 24, since they are pointing towards ATS entries. A pointer to RP3 will be stored as (24, M5) at B3__c1 location, while a pointer to NRP4 will be indicated by (24, M7) at B3__c4 location (step 714).

The previous pointer to RP3, located at B2__c4, is replaced with a pointer to (TG7, B3) (step 715) (FIGS. 8b–c).

If an NRP is mapped into an FTB or an NTB entry having a test command value equal to 0, the search tree is then extended as follows. With respect to an FTB having a test command value of 0, a new ATS entry is obtained (step 706). This is illustrated by NRP3 within FIGS. 8b–c. This is because FTBn was a "dead end" node. FTBn is then updated to have test instructions with a test command value of 24 and a 13 bit pointer pointing to ATS entry M4 (step 707).

In FIG. 8a, if NRP is mapped into next test block B4__c4, which is a "dead end" node having a test command value of 0, then a new ATS entry, M3, is created (step 706 after steps 704 and 705), and the pointer (24, M3) in B4__c4 is updated to point towards ATS entry M3 (24, M3) (step 707) (FIGS. 8b–c).

As noted above, if NRP and RP are exactly matched, only the RP signature information is updated. This is illustrated by NRP1 being matched through to ATS entry M2, which includes RP2 (steps 710, 711 and 713) (FIG. 8a).

Figure 9:
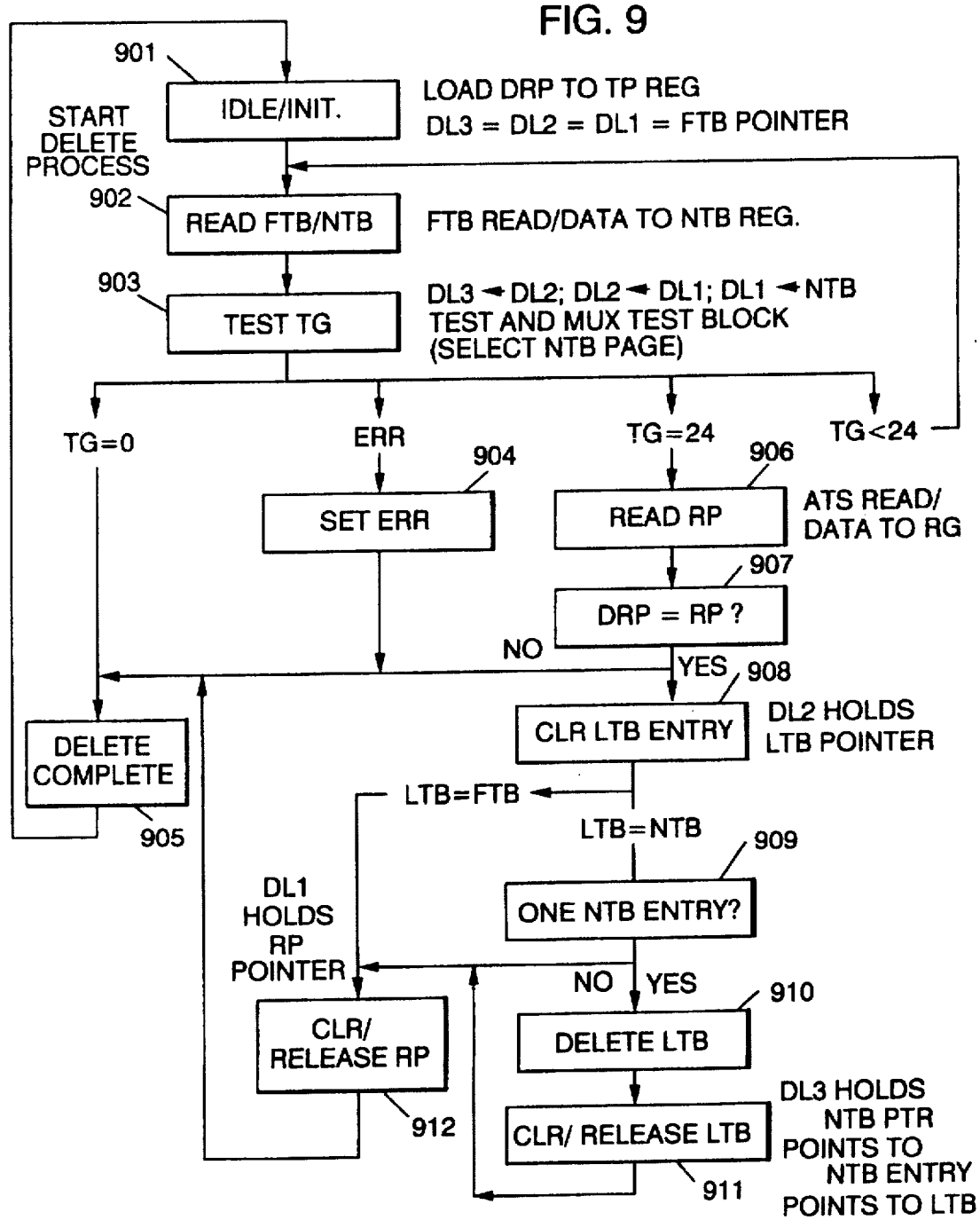
FIG. 9 illustrates a flow diagram for deleting addresses in accordance with the present invention.

Referring next to FIG. 9, there is illustrated a flow diagram for deleting an entry from a search tree. Such a condition might occur when a particular device within network 100 is removed and it is desired that router 102 no longer route information to the non-existent device. Remember that each ATS entry also includes an associated port within router 102.

The logic diagram of FIG. 6 is also utilized for the pattern match portion of the entry delete flow diagram of FIG. 9.

In step 901, the process loads a reference pattern to be deleted ("DRP") into register 60. Registers DL1, DL2 and DL3 are all set equal to the FTB pointer. Multiplexor 65 then transmits the 12 bit pointer address to FTB memory in order to retrieve the test command and pointer information for storage into register 62 (step 902). At step 903, the test command value stored within FTB is accessed. The contents of DL2 are placed in DL3; the contents of DL1 are placed in DL2; and, the NTB pointer is placed in DL1. If the test command value is equal to 0, then this indicates that a "dead end" node has been reached and that it is not necessary to proceed any further with the delete process since the reference pattern to be deleted does not exist within the memory (step 905). The process then returns to step 901.

If an error condition occurs (such as described above), the process proceeds to step 904.

If the test command value is less than 24, the process returns to step 902 wherein the next test group within the 36 bits stored within register 60 is then selected by selector 64 and transferred to mux 66 to be combined with the 13 bit pointer stored within register 62. This multiplexed group of bits is then utilized to address the memory within router 102 for the next test block (step 902), which test block is then read into register 62. In step 903, the test command is then determined as before.

If a test command equal to 24 is ever obtained, then in step 906, the 13 bit pointer is transferred to multiplexor 67 to be multiplexed with the test group data from selector 64 to then address the ATS memory locations for the stored reference pattern, which is then read into register 61. At step 907, comparator 63 determines whether or not DRP is equal to the obtained reference pattern. If not, the process proceeds to step 905 wherein the delete process has been completed since no reference pattern exists within the ATS memory that matches the reference pattern that was to be deleted. However, if within step 907, DRP is equal to RP, then the process proceeds to step 908 wherein the pointer entry within the last test block pointing to the ATS entry to be deleted is then cleared (DL2 holds the LTB pointer) and clear the LTB (located either in FTB or NTB). If this entry to be cleared happens also to be in the FTB, then this FTB is cleared and the ATS memory entry is released to the free pool.

However, if the cleared LTB is not in the FTB, but is instead an intermediary node, then the process within step 909 determines whether or not this NTB includes one non-zero entry. If not, then this corresponding entry within the NTB is also cleared and the ATS memory entry provided to the free pool (step 912). However, if there is only one test instruction stored within the NTB, then this last test block is deleted in step 910 and released within step 911.

Figure 10A:
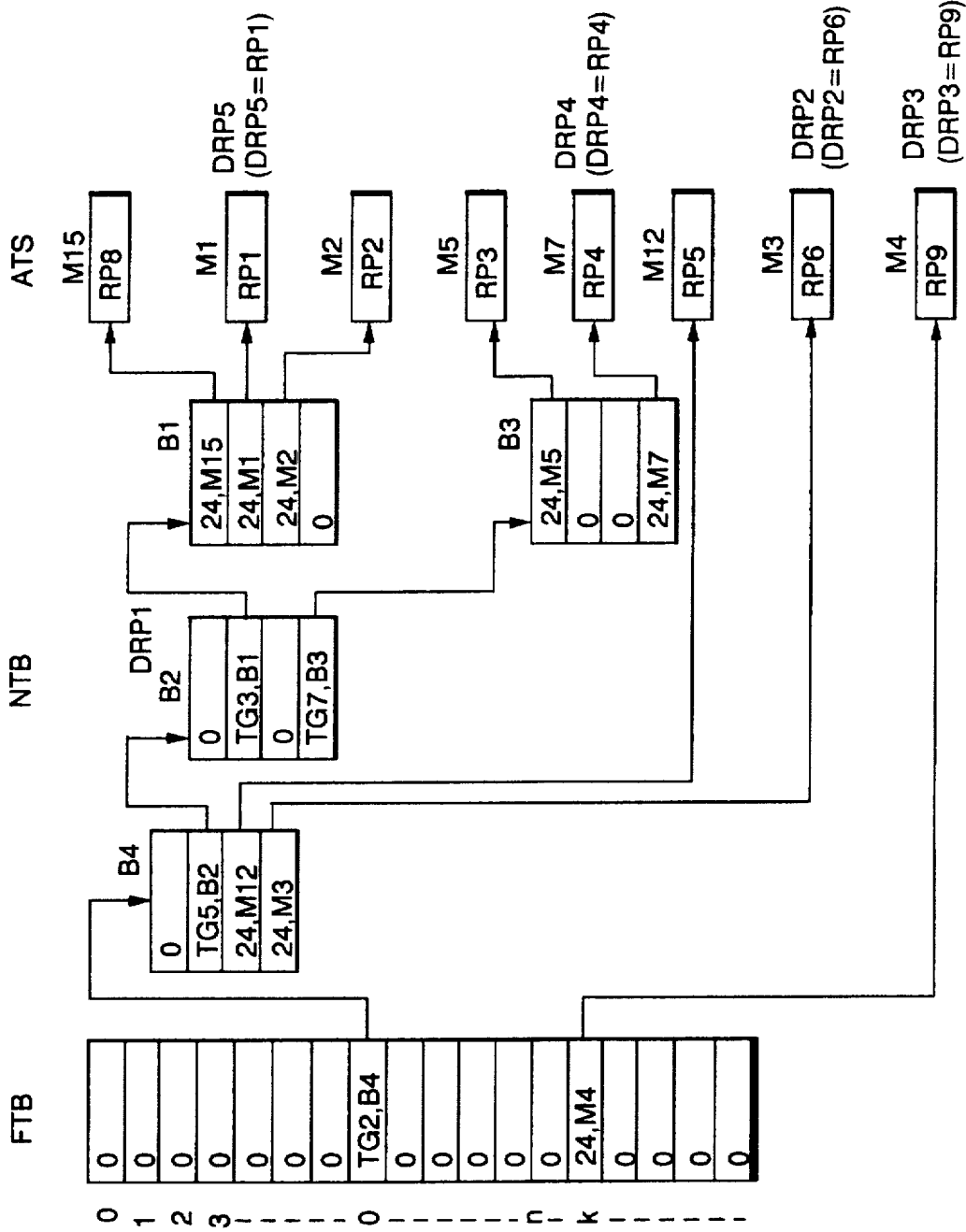
FIGS. 10a–c illustrate an example search tree having addresses deleted therefrom.
Figure 10B:
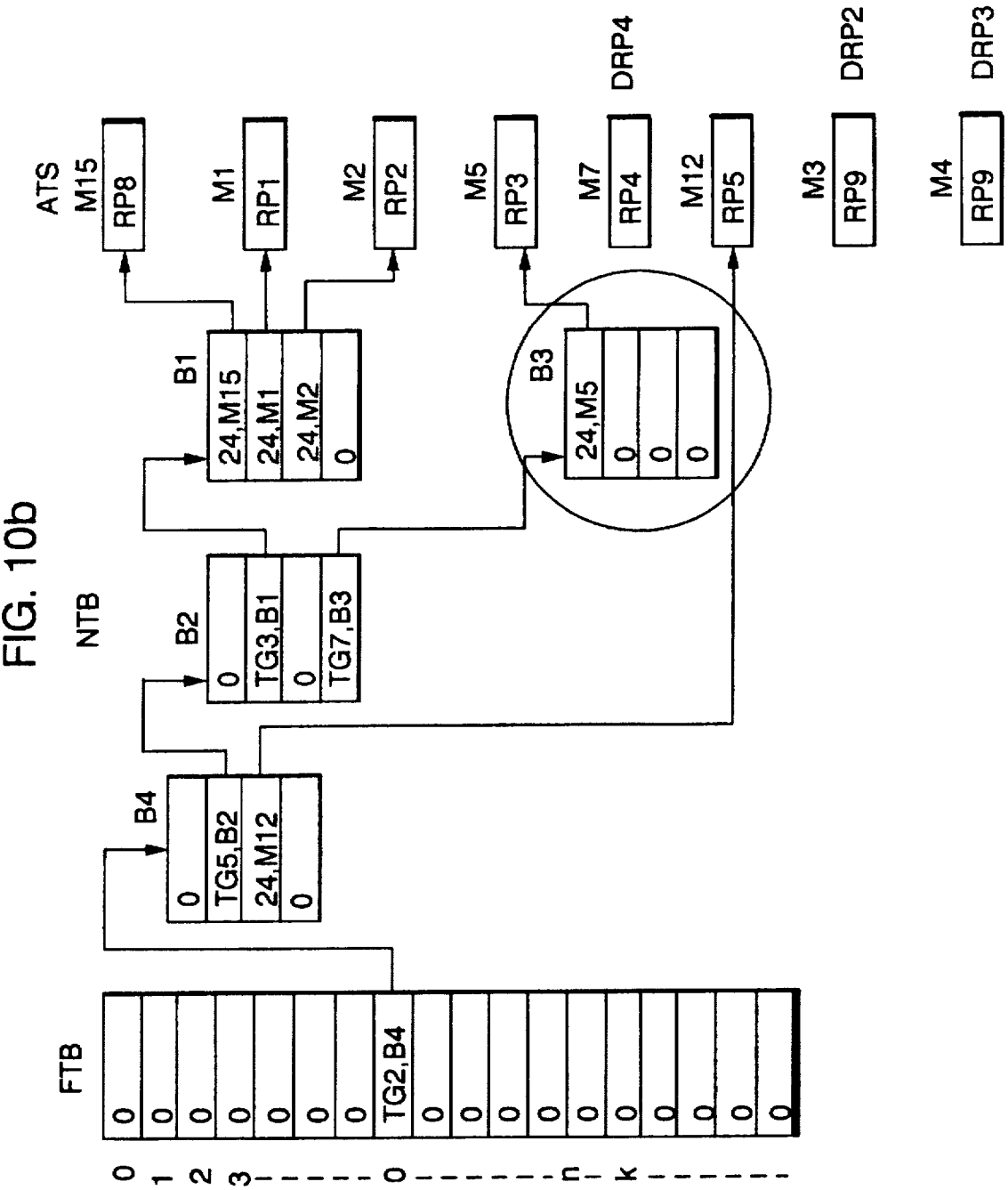
Figure 10C:
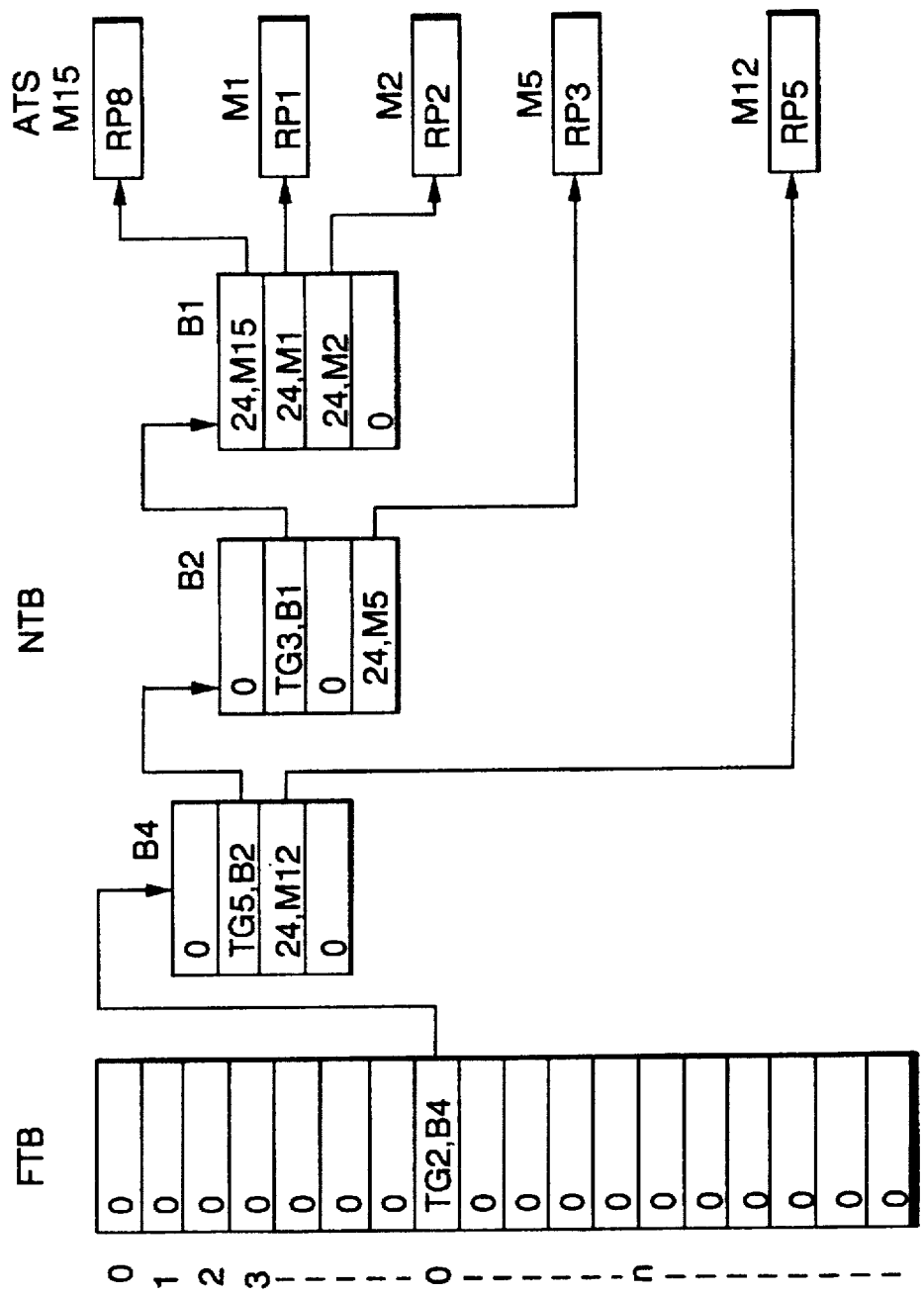

To further describe the delete entry process, please refer to FIGS. 10a–c, wherein there is illustrated a search tree wherein entries have been deleted.

Note that DRP1 has mapped into a dead end node, B2_c1 (FIG. 10a). In this instance, B2_c1 will have a test command value of 0 and no further action is required (step 905).

DRP2 has mapped into RP6, which is stored within ATS memory location M3 (FIG. 10a). In this case, the test command within B4_c4 had a value of 24. The content of B4_c4 is cleared (step 908) (FIG. 10b). ATS memory location M3 is cleared and released to the free pool (step 912) (FIG. 10c). And since B2 has more than one entry, the deletion is complete (step 905).

DRP3 has mapped into RP9 (step 907) (FIG. 10a). The content of FTBk is cleared (step 908) (FIG. 10b). ATS entry M4 is cleared and returned to the ATS free pool (step 912) (FIG. 10c). Nothing further is required since the last test block proceeding the ATS entry was a first test block (FTBk).

DRP4 has mapped into RP4 at ATS entry M7 (step 907) (FIG. 10a). In this instance, B3_c4 is cleared (step 908) (FIG. 10b). Since B3 has only one other entry, B3_c1 (step 909), the process proceeds to step 910 in order to delete B3 (step 910) and clear it and also release that memory location required for B3 to the NTB free pool (step 911) (FIG. 10b). A new pointer in B2_c4 is implemented to point towards the remaining ATS entry RP3 (FIG. 10c).

Figure 11:
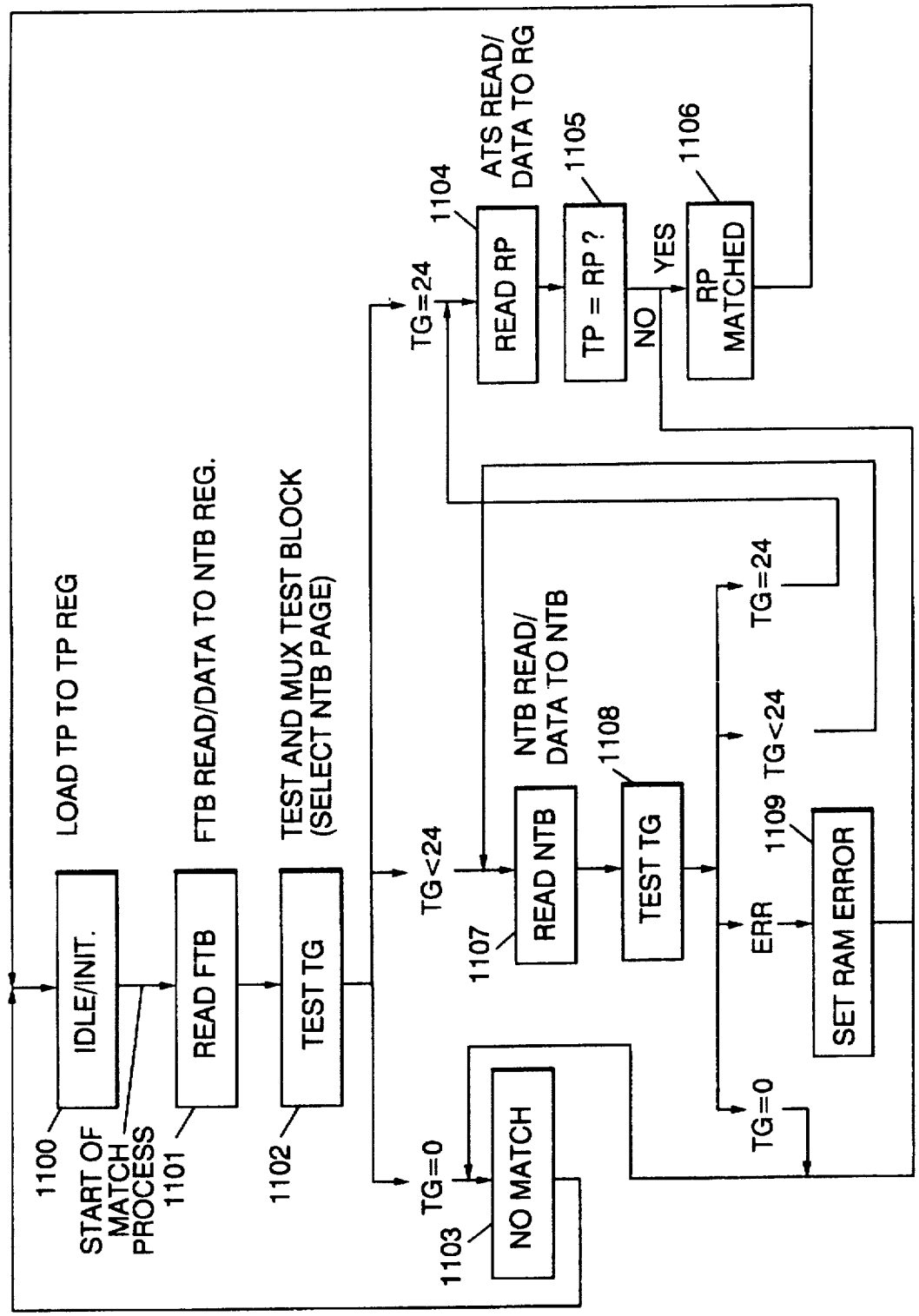
FIG. 11 illustrates a flow diagram for implementing the address matching process of the present invention.

Referring next to FIG. 11, there is shown a flow diagram illustrating the process for finding matches within a search tree so that router 102 can then route received frames of data to its intended destination. In step 1100, the process loads a received Destination Address into register 60. At step 1101, the 12 bit FTB block of data is utilized by multiplexor 65 to search the router memory for the next test block, which is stored within register 62. At step 1102, a test is performed to determine the value of the test command portion of the test block data. If the test command has a value of 0, then at step 1103, the process determines that there is no match and the process returns to step 1100. In such a case, router 102 will perform a broadcast of the received data (step 36).

If the test command has a value less than 24, then this indicates that another node within the search tree is to be traveled. At step 1107, multiplexor 66 combines the test group data received from selector 64 with the 13 bit pointer received from register 62 in order to provide an address into the NTB memory locations, wherein an NTB is read and entered into register 62. Again, at step 1108, a test is done on the test command stored within register 62. If the test command has a value of 0, the process proceeds to step 1103, and if the test command has a value less than 24, the process loops around to step 1107 to thus travel through another node within the search tree.

If at either steps 1102 or 1108 the test command has a value equal to 24, indicating that a reference pattern match exists with the new reference pattern, the process proceeds to step 1104, wherein multiplexor 67 utilizes the test group bits from selector 64 with the pointer bits from register 62 to then address the ATS memory locations for the matching reference pattern, which is then read into register 61. At step 1105, comparator 63 determines whether or not the test pattern equals the retrieved reference pattern. If not, the process proceeds to step 1103. However, if the test pattern does equal to the stored reference pattern within the ATS, the process proceeds to step 1106 where a match is determined to exist. This will then allow router 102 to route the frame of data to its intended destination through the router port associated with the reference pattern matched (step 35).

Referring next to FIG. 12, there is illustrated an implementation of the present invention within router 102. Note that RAM 1212 contains the memory locations FTB, NTB and ATS. DA match engine 1206 receives Destination Address data from the TP data bus and performs Destination Address matching (see FIG. 11). SA match engine 1207 receives Source Address data from the TP data bus and performs Source Address matching (see FIG. 7). Time stamps are provided if a match of a reference pattern is found. The microprocessor compare engine 1208 receives data from the microprocessor bus and performs pattern matching (comparator 63 in FIG. 6). Entry update engine 1209 receives NRP data from the microprocessor bus and performs ATS entry updates as described above (FIG. 7). Entry delete engine 1210 receives DRP data from the microprocessor bus and performs ATS entry deletes (FIG. 9). Microprocessor interface logic 1202 allows the microprocessor within router 102 to communicate with all the engines, issue commands, and read-write to RAM 1212 as required. Task scheduler 1204 arbitrates the RAM bus access for engines 1205–1210. TP bus arbitration 1201 arbitrates devices sharing the TP services and grants the bus to the proper device for its TP service request.

Although the present invention and its advantages have been described in detail, it should be understood that various changes, substitutions and alterations can be made herein without departing from the spirit and scope of the invention as defined by the appended claims.

What is claimed is:

1. A method for routing data in a data processing system, wherein said data is associated with a destination address within said system, said method comprising the steps of:

comparing said destination address to a database of destination addresses by comparing a first portion of said destination address to a first partition of said database, wherein a subsequent comparison of a second portion of said destination address to a second partition of said database occurs when the first portion of said destination address and the first partition of said database match; and routing said data to said destination when said first and second portions of said destination address are matched with a corresponding one of the first and second partitions of said database.

2. The method as recited in claim 1 wherein said first and second partitions of said database of destination addresses are arranged in a search tree.

3. The method as recited in claim 1 wherein each of the first and second partitions of said database includes a pointer to a subsequent partition, said pointer operable to initiate said subsequent comparison only when a previous comparison operation indicates a previous portion of said destination address matches a previous partition of said database.

4. The method as recited in claim 2, further comprising the step of:

adding an unmatched portion of said destination address to said search tree when a portion/partition pair do not match.

5. The method as recited in claim 1 wherein said system comprises a network of data processing devices.

6. A system adaptable for routing data between data processing devices within a network, said system comprising:

interface means adaptable for communicating data with said data processing devices, wherein said data includes a destination address associated with one of said processing devices;

means for comparing a plurality of portions of said destination address to a plurality of addresses stored in one or more search trees, wherein said plurality of addresses are associated with said data processing devices, a first one of the plurality of portions of said destination address matching a first one of the plurality of addresses before a second one of the plurality of portions of said destination address may be compared with a second one of the plurality of addresses; and means adaptable for transmitting said data to one of said data processing devices through said interface means when said comparing means matches each of the plurality of portions of said destination address to one of said plurality of addresses.

7. The system as recited in claim 6 wherein said data includes a source address associated with one of said processing devices from which said data originated, said system further comprising:

means for comparing said source address to said plurality of addresses stored in said one or more search trees; and means for appending said source address to one of said one or more search trees when said means for comparing does not match said source address to one of said plurality of addresses stored in said one or more search trees.

8. The system recited in claim 6, further comprising:

means for discarding said data when said means for comparing matches said destination address with an address associated with one of said devices from which said data originated.

9. The system as recited in claim 6, further comprising:

means adaptable for broadcasting said data to all of said processing devices through said interface means when said means for comparing does not match said destination address to one of said plurality of addresses stored in said one or more search trees.

10. The system as recited in claim 6, further comprising:

means for deleting one of said plurality of addresses stored in said one or more search trees.

\* \* \* \* \*